(12) United States Patent
Rothman et al.

(10) Patent No.: US 7,107,440 B2
(45) Date of Patent: Sep. 12, 2006

(54) METHODS AND APPARATUS TO MODIFY ALTERNATE STORAGE IN A PRE-BOOT ENVIRONMENT

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 10/369,167

(22) Filed: Feb. 19, 2003

(65) Prior Publication Data

US 2004/0162973 A1 Aug. 19, 2004

(51) Int. Cl.
*G06F 15/177* (2006.01)

(52) U.S. Cl. .......................................... 713/1; 711/100

(58) Field of Classification Search ............... None
See application file for complete search history.

(56) References Cited

U.S. PATENT DOCUMENTS

| 5,444,850 | A | * | 8/1995 | Chang | 709/222 |
| 5,537,626 | A | * | 7/1996 | Kraslavsky et al. | 710/8 |
| 6,708,231 | B1 | * | 3/2004 | Kitagawa | 710/10 |
| 6,728,787 | B1 | * | 4/2004 | Leigh | 719/327 |
| 6,728,860 | B1 | * | 4/2004 | Lloyd-Jones | 711/206 |

* cited by examiner

*Primary Examiner*—Lynne H. Browne
*Assistant Examiner*—Anand B. Patel
(74) *Attorney, Agent, or Firm*—Hanley, Flight & Zimmerman, LLC

(57) ABSTRACT

Methods and apparatus to modify alternate storage are disclosed. In an example, a method includes receiving an interface from a device in the pre-boot environment, wherein the interface identifies a location of the device and a location of alternate storage on the device and receiving a request for modification of the alternate storage of the device. The example method may also include receiving modification data to be written into the alternate storage of the device and writing the modification data to the alternate storage of the device using the interface in the pre-boot environment.

34 Claims, 5 Drawing Sheets

METHODS AND APPARATUS TO MODIFY ALTERNATE STORAGE IN A PRE-BOOT ENVIRONMENT

TECHNICAL FIELD

The present disclosure pertains to computing systems and, more particularly, to methods and apparatus to modify alternate storage.

BACKGROUND

Processor-based systems, such as personal computers, typically include a motherboard on which a main processor and memory are disposed. Additionally, the motherboard includes a number of slots into which peripherals may be installed. For example, a personal computer may include peripherals such as a hard drive controller, a display or graphics adapter, a network adapter and a modem, each of which is installed into a slot on the motherboard or is in communication with the motherboard through other means.

Each of the peripherals associated with the processor system includes a memory portion that stores configuration or operation information and data for the peripheral. This information and data is commonly referred to as firmware. The firmware is typically stored in some non-volatile (NV) storage, such as non-volatile random access memory (NVRAM), of which flash memory is one particular example.

Ideally, peripherals are bug free and their firmware is timeless. However, in reality firmware upgrades need to be made to correct bugs and to update firmware for interoperability. The firmware on the peripherals is not, however, openly exposed at a user interface that enables user maintenance of the firmware. The motherboard processor is unable to update the peripheral firmware because the basic input/output system (BIOS) of the processor is unaware of the layout, access methods and protection of the firmware on the peripherals. Accordingly, updating peripheral firmware can be very challenging. Adding to this difficulty, there is presently no standard methodology for carrying out firmware updates on peripherals. For example, some peripheral vendors ship operating system (OS)-specific drivers when firmware upgrades are required. However, such upgrades are not OS agnostic, meaning that a special driver must be written for each OS. For example, if a peripheral vendor wants to distribute a firmware upgrade, the vendor must distribute a Linux version, a Windows NT version, a Windows 95 version, etc.

DETAILED DESCRIPTION

Although the following discloses example systems including, among other components, software or firmware executed on hardware, it should be noted that such systems are merely illustrative and should not be considered as limiting. For example, it is contemplated that any or all of these hardware and software components could be embodied exclusively in dedicated hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
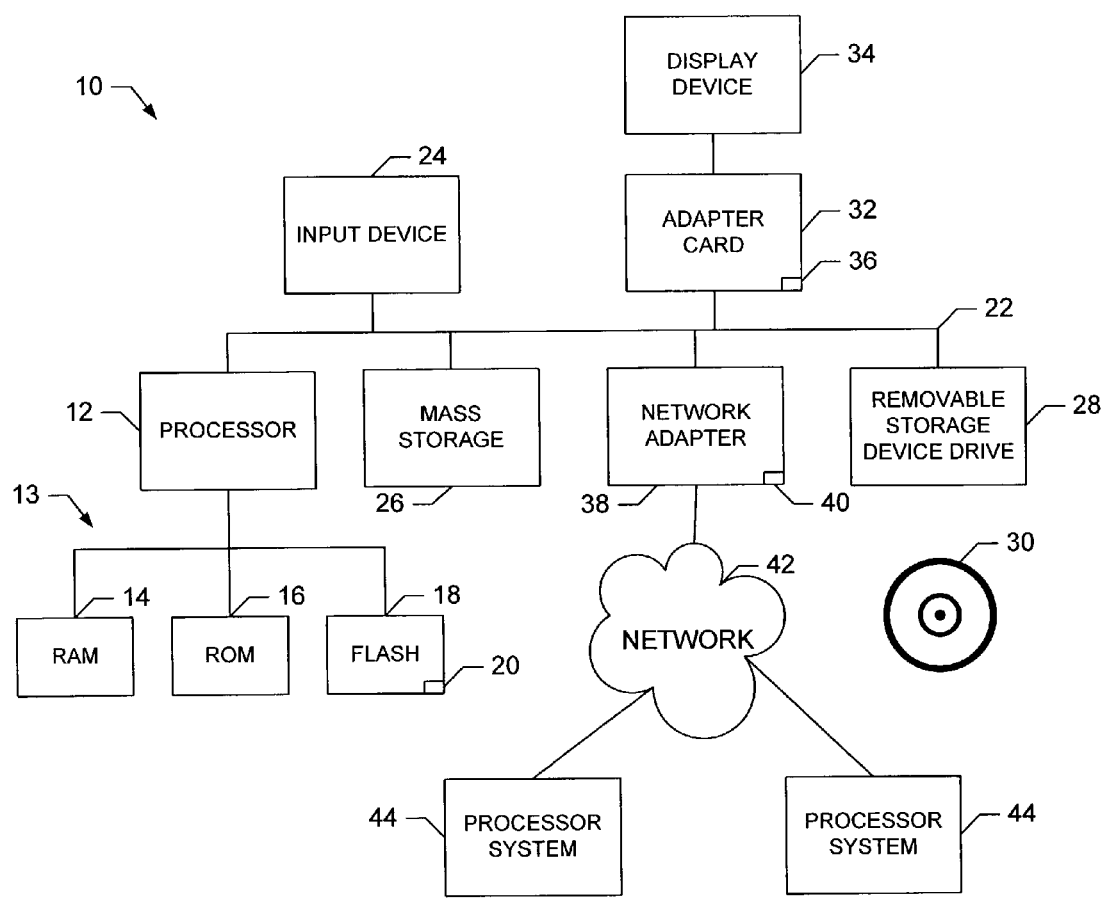
FIG. 1 is a diagram of an example processor system.

Turning now to FIG. 1, an example processor system 10 includes a processor 12 having associated system memory 13. The system memory 13 may include one or more of a random access memory (RAM) 14, a read only memory (ROM) 16 and a flash memory 18. The flash memory 18 of the illustrated example includes a boot block 20.

The processor 12 is coupled to an interface, such as a bus 22 to which other components may be interfaced. In the illustrated example, the components interfaced to the bus 22 include an input device 24, a mass storage device 26 and a removable storage device drive 28. The removable storage device drive 28 may include associated removable storage media 30, such as magnetic or optical media.

The example processor system of FIG. 1 also includes an adapter card 32 (i.e., a processor peripheral) coupled to the bus 22 and further coupled to a display device 34. As described in further detail below, the adapter card 32, which interfaces the display device 34 to the bus 22, includes memory 36 that is referred to hereinafter as alternate storage, in that the memory 36 is separate from the system memory 13.

The example processor system 10 may be, for example, a conventional desktop personal computer, a notebook computer, a workstation or any other computing device. The processor 12 may be any type of processing unit, such as a microprocessor from the Intel® Pentium® family of microprocessors, the Intel® Itanium® family of microprocessors, and/or the Intel XScale® family of processors.

The memories 14, 16 and 18, which form some or all of the system memory 13, may be any suitable memory devices and may be sized to fit the storage demands of the system 10. In particular, the flash memory 18 is a low-cost, high-density, high-speed architecture having low power consumption and high reliability. The flash memory 18 is a non-volatile memory that is accessed and erased on a block-by-block basis.

The input device 24 may be implemented by a keyboard, a mouse, a touch screen, a track pad or any other device that enables a user to provide information to the processor 12.

The display device 34 may be, for example, a liquid crystal display (LCD) monitor, a cathode ray tube (CRT) monitor or any other suitable device that acts as an interface between the processor 12 and a user via the adapter card 32. The adapter card 32 is any device used to interface the display device 34 to the bus 22. For example, such cards are presently commercially available from, for example, Creative Labs and other like vendors. Regardless of the vendor, the adapter card 32 includes the memory 36, which may be, for example, a non-volatile RAM (NVRAM) device, such as flash memory. Within the memory 36 may be stored various configuration parameters or settings that govern the operation of the adapter card 32. The information stored in the memory 36 of the adapter card 32 may be referred to as firmware that is specific to the adapter card 32.

The mass storage device 26 may be, for example, a conventional hard drive or any other magnetic or optical media that is readable by the processor 12.

The removable storage device drive 28 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 30 is complimentary to the removable storage device drive 28, inasmuch as the media 30 is selected to operate with the drive 28. For example, if the removable storage device drive 28 is an optical drive, the removable storage media 30 may be a CD-R disk, a CD-RW disk, a DVD disk or any other suitable optical disk. On the other hand, if the removable storage device drive 28 is a magnetic media device, the removable storage media 28 may be, for example, a diskette or any other suitable magnetic storage media.

The example processor system 10 also includes a network adapter 38 (i.e., a processor peripheral), such as, for example, an Ethernet card or any other card that may be wired or wireless. The network adapter 38 includes a memory 40 in which various settings and configuration information for the network adapted 38 are stored. Like the information in the memory 36, the information stored in the memory 40 may be referred to as firmware. However, the information stored in the memory 40 is firmware specific to the network adapter 38. The network adapter 38 provides network connectivity between the processor 12 and a network 42, which may be a local area network (LAN), a wide area network (WAN), the Internet or any other suitable network. As shown in FIG. 1, further processor systems 44 may be coupled to the network 42, thereby providing for information exchange between the processor 12 and the processors of the processor systems 44. Like the memory 36, the memory 40 is referred to hereinafter as alternate storage device because it is a memory remote from the system memory 13.

As described in detail hereinafter, the disclosed system enables the processor 12 to modify information stored in the alternate storage (e.g., the memories 36 and/or 40). The disclosed system may be utilized in pre-boot, (i.e., before an operating system (OS) is loaded), or in runtime (i.e., after an OS is operational). The disclosed system is OS agnostic because the system does not require drivers and user-mode applications that are specific to each alternate storage device.

Figure 2:
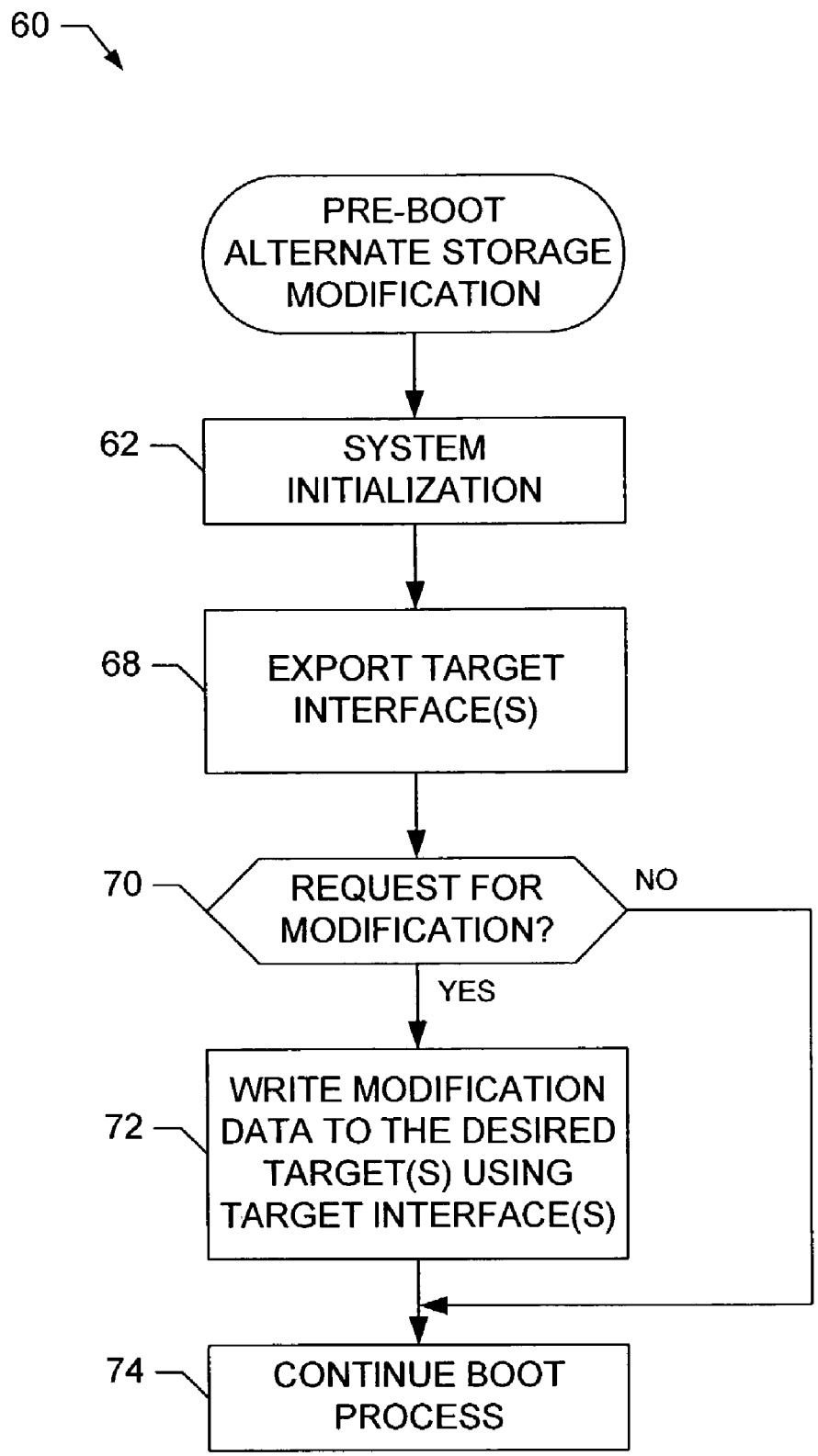
FIG. 2 is a flow diagram of an example pre-boot alternate storage modification process.
Figure 3:
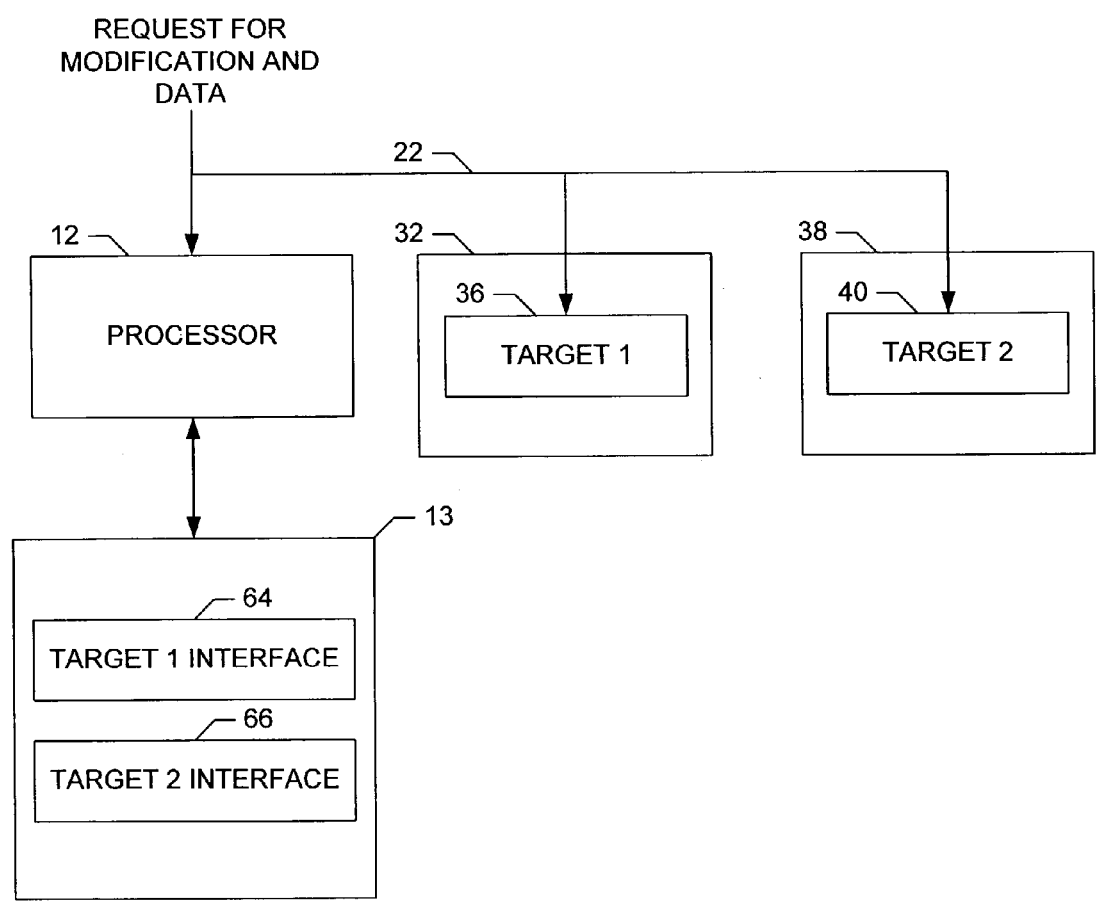
FIG. 3 is diagram of an example processor system described in conjunction with the process of FIG. 2.

The pre-boot operation of the disclosed system is described in conjunction with FIGS. 2 and 3. A pre-boot alternate storage modification process 60, as shown in FIG. 2, commences upon reset or power-up of the processor 12. Upon experiencing the reset or upon being powered-up, the processor 12 executes the boot block 20, which causes the processor 12 to perform system initialization (block 62). System initialization may include, but is not limited to zeroing registers, resetting counters and the like.

Each device, which includes a memory target that could be updated (e.g., the memories 36 and 40 of the adapter card 32 and the network adapter 38, respectively), exports a target interface 64, 66 to the system memory 13 (block 68 of FIG. 2). The target interfaces 64, 66 include information pertinent to addressing the memories 36, 40 that would be the targets of the proposed modifications and may also include a driver. For example, the target interface 64 includes the address (path) of the adapter card 32 and further includes the address of the memory 36 on the adapter card 32. The paths may be defined in terms of a slot in which the peripheral is inserted, the function of the peripheral, and a globally unique identifier (GUID), which is a 128 bit value assigned to each peripheral. Additionally, the target interface 66 includes the address of the network adapter 38 and further includes the address of the memory 40 on the network adapter 38. As described in further detail below, the processor 12 uses the information included in the target interfaces 64, 66 to modify the contents of the alternate storage (e.g., the memories 36, 40), if necessary. In general the target interfaces 64, 66 are interfaces that can be identified by handle definitions and that include information the processor 12 uses to associate the interfaces with particular hardware devices (e.g., the adapter card 38 and the network adapter 38).

The process 60 determines if there has been a request for modification of one or more of the memories 36, 40 (block 70). The request for modification could be provided to the processor 12 via the bus 22 and could be received from one of the processor systems 44. For example, during run time, a remote administrator at one of the processor systems 44 could request modification of the adapter card memory 36 via a user interface and the network 42. The request would be made with an attachment of modification data that the remote administrator wants written to the memory 36.

If a request for modification has been made (block 70), the processor 12 writes the modification data to the memory (e.g., the memory 36 and/or 40) of the desired target (e.g., the adapted card 32 and/or the network adapter 38) (block 72). The processor 12 uses the appropriate interface 64 and/or 66 to write the modification to the appropriate memory 36 and/or 40. The update of the memories 36 and/or 40 may be carried out using host protected addressing (HPA) to ensure secure storage.

If the processor 12 does not detect a request for modification (block 70) or after the modification data has been written to the desired target, the process 60 continues to execute the boot block (block 74). Continuing to boot may include, for example, the loading and execution of an OS or any other desirable functions.

Figure 4:
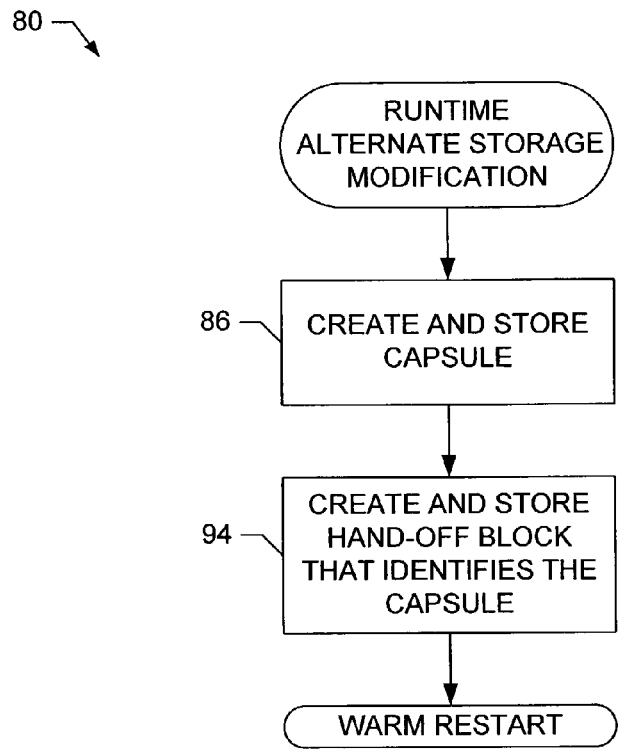
FIG. 4 is a flow diagram of an example runtime alternate storage modification process.
Figure 5:
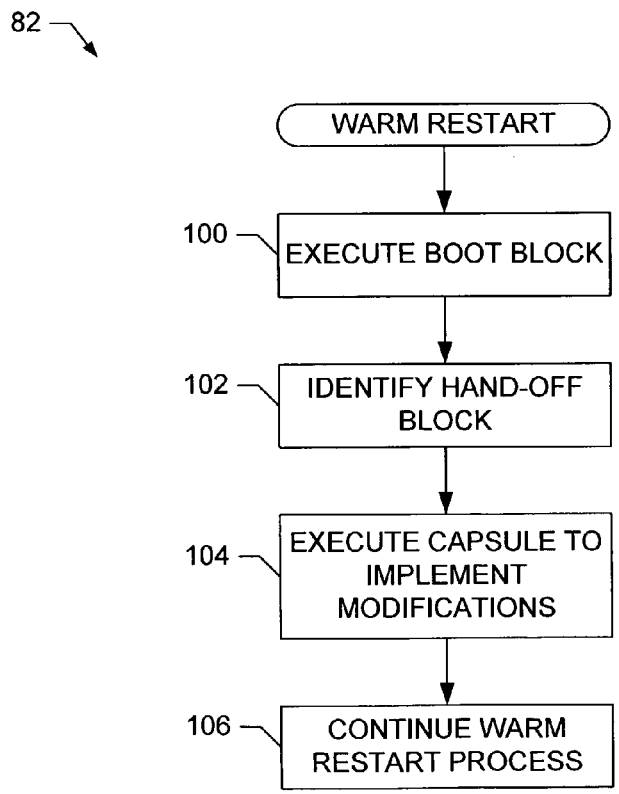
FIG. 5 is a flow diagram of an example warm restart process.
Figure 6:
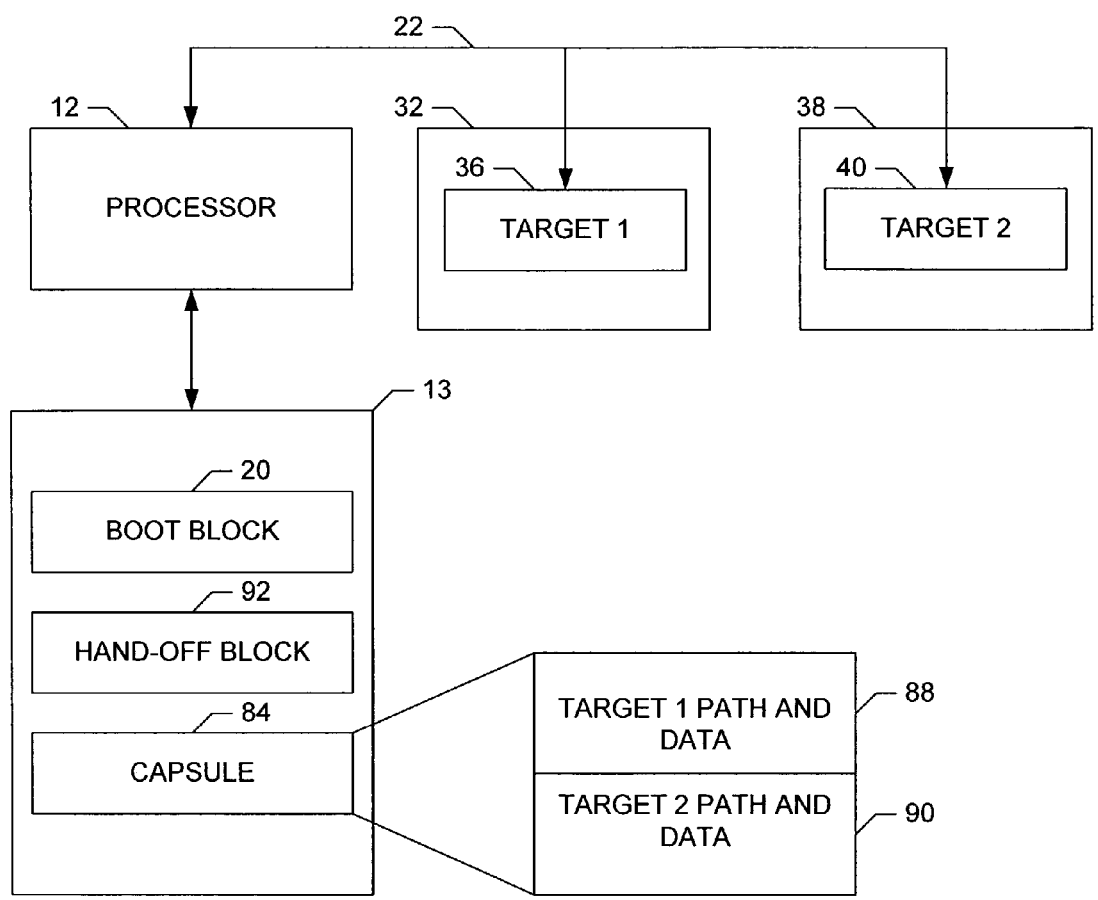
FIG. 6 is a diagram of an example processor system described in conjunction with FIGS. 4 and 5.

After an OS has been booted and a modification to the alternate storage (e.g., one or more of the memories 36, 40) is desired, such a modification may be carried out according to a runtime alternate storage modification process 80, as shown in FIG. 4 and the warm restart process 82 of FIG. 5. The operational aspects of the processes 80 and 82 are described in conjunction with FIG. 6. In general, runtime modification takes place by: (a) creating a data capsule including modification data (described in conjunction with FIG. 4) and (b) restarting the processor system (described in conjunction with FIG. 5).

The process 80 is commenced when an administrator, or some other entity, creates and stores a capsule 84 through the use of a user interface. The capsule 84 includes an identification of the target device (e.g., the memory 36 and/or 40) and modification data (block 86). In the example, shown in FIG. 6, the capsule 84 includes a target 1 path and data 88 and a target 2 path and data 90. As noted previously, paths may be defined in terms of a slot in which the peripheral is inserted, the function of the peripheral and a GUID. The capsule 84 is stored in system memory 13 and, in particular, may be stored in the RAM 14 or the flash memory 18. The administrator may create the capsule 84 using the processing system 10 on which the modification is to be made. Alternatively, the capsule 84 could be created by an administrator located at one of the processor systems 44 and placed in the system memory 13 via the network 42. For example, software, such as specific drivers, patches, workarounds, hotfixes and the like, which may include changes to be made to peripherals, may be bundled together and deployed in capsule form by information technology (IT) personnel. In such a case, the software in the capsule would be designed o be installed on the peripheral for which the software was intended. The capsule contains a pre-boot application including sufficient information to identify the correct interface to a particular device, as well as a data payload for that device.

After the capsule 84 is created and stored (block 86), a hand-off block 92 that identifies the location of the capsule is written into system memory 13 (block 94). As will be readily appreciated, the hand-off block 92, which is a pointer to the location of the capsule 84, is written into system memory 13 in a location that is checked by the processor 12 as directed by the boot block 20.

After the hand-off block 92 and the capsule 84 have been written into system memory 13, the process 80 commences the warm restart process 82 of FIG. 5. Upon initiation of the warm restart process 82, the processor 12 begins execution at the boot block 20 (block 100). In the process of the boot block execution, the processor 12 identifies the location of the hand-off block 92, the contents of which points to the capsule 84 (block 102).

The processor 12 proceeds to open the capsule 84 and to execute the contents of the capsule 84 to implement the modifications (block 104). As noted previously, the capsule 84 includes, for each target, a path to a location of the target and information to be written to the target. Accordingly, the processor 12 writes the modification data to the desired target or targets 36, 40 and, subsequently, continues the warm restart process (block 106).

If the updates are stored in the flash memory 18, the processor 12 is able to use the block-locking feature of the flash memory 12 to prevent unauthorized information from being written into the capsule. Block-locking may be used in tandem with host protected addressing (HPA) to ensure secure storage on restart. Accordingly, through the use of HPA and block locking, the updates in the capsule are in the root of trust for the firmware. This is because the capsule is the first code to be executed by the processor 12 upon awakening and because the flash memory 18 was previously locked and is being accessed securely.

Although certain apparatus constructed in accordance with the teachings of the invention have been described herein, the scope of coverage of this patent is not limited thereto. On the contrary, this patent covers all apparatuses, methods and articles of manufacture of the teachings of the invention fairly falling within the scope of the appended claims either literally or under the doctrine of equivalents.

What is claimed is:

1. A method of modifying the contents of alternate storage in a pre-boot environment, the method comprising:
   receiving an interface from a device in the pre-boot environment, wherein the interface identifies a location of the device and a location of the alternate storage on the device;
   receiving a request for modification of the alternate storage of the device;
   receiving modification data to be written into the alternate storage of the device; and
   writing the modification data to the alternate storage of the device using the interface in the pre-boot environment.

2. A method as defined by claim 1, further comprising storing the interface in a memory associated with a processor.

3. A method as defined by claim 1, wherein the alternate storage comprises a non-volatile random access memory location.

4. A method as defined by claim 1, wherein the device comprises a processor peripheral.

5. An article comprising a machine-accessible medium having a plurality of machine accessible instructions that, when executed, cause a machine to:
   receive an interface from a device coupled to the machine in a pre-boot environment, wherein the interface identifies a location of the device and a location of the alternate storage on the device;
   receive a request for modification of the device;
   receive modification data to be written to the device; and
   write the modification data to the device via the interface in the pre-boot environment.

6. An article as defined by claim 5, wherein the interface for use in modifying the alternate storage is stored in the machine-accessible medium.

7. An article as defined by claim 5, wherein the interface identifies a location of the device and a location of alternate storage on the device to which the modification data is to be written.

8. An article as defined by claim 7, wherein the alternate storage comprises a memory location on the device.

9. An article as defined by claim 8, wherein the alternate storage comprises a non-volatile random access memory location.

10. An article as defined by claim 5, wherein the device comprises a processor peripheral.

11. A system comprising:
    a memory;
    a peripheral including alternate storage, wherein the peripheral is configured to export an interface that identifies a location of the peripheral and a location of the alternate storage of the peripheral; and
    a processor coupled to the memory and the peripheral, the processor being configured to store modification data in the alternate storage of the peripheral via the interface.

12. A system as defined by claim 11, wherein the interface for use in modifying the alternate storage is stored in the memory.

13. A system as defined by claim 11, wherein the alternate storage comprises a memory location on the peripheral.

14. A system as defined by claim 13, wherein the alternate storage comprises a non-volatile random access memory.

15. A system as defined by claim 11, wherein the peripheral comprises a processor peripheral.

16. A method of modifying the contents of alternate storage of a device interfaced to a processor, comprising:
    detecting a reset;
    accessing a data capsule including an interface, wherein the interface identifies a location of the device and a location of the alternate storage on the device and wherein the data capsule further includes modification data to be written into the alternate storage of the device; and
    writing the modification data into the alternate storage of the device via the interface.

17. A method as defined by claim 16, wherein the alternate storage comprises a memory location on the device.

18. A method as defined by claim 17, wherein the alternate storage comprises a non-volatile random access memory location.

19. A method as defined by claim 16, wherein the data capsule is stored in a memory associated with a processor.

20. A method as defined by claim 16, wherein the device comprises a processor peripheral.

21. A method as defined by claim 16, wherein accessing the data capsule comprises identifying a location of the data capsule via a hand-off block.

22. A method as defined by claim 16, further comprising proceeding with a warm restart process after the modification data is written into the alternate storage of the device.

23. A method as defined by claim 16, further comprising allowing a user to create and store the data capsule and allowing the user to create and store a hand-off block that identifies a location of the data capsule.

24. An article comprising a machine-accessible medium having a plurality of machine accessible instructions that, when executed, cause a machine to:
   access a data capsule including an interface, wherein the interface identifies a location of a device and a location of alternate storage on the device and wherein the data capsule further includes modification data to be written into the alternate storage of the device; and
   write the modification data into the alternate storage of the device via the interface.

25. An article as defined by claim 24, wherein the alternate storage comprises a memory location on the device.

26. An article as defined by claim 25, wherein the alternate storage comprises a non-volatile random access memory location.

27. An article as defined by claim 24, wherein the data capsule is stored in a memory associated with a machine.

28. An article as defined by claim 24, wherein the device comprises a processor peripheral.

29. An article as defined by claim 24, further comprising instructions that, when executed, cause the machine to proceed with a warm restart process after the modification data is written into the alternate storage of the device.

30. An article as defined by claim 24, further comprising instructions that, when executed, cause the machine to allow a user to create and store the data capsule and allowing the user to create and store a hand-off block that identifies the location of the data capsule.

31. A system comprising:
   a peripheral including alternate storage;
   a memory storing a data capsule identifying a location of a peripheral and a location of the alternative storage on the peripheral, wherein the data capsule further includes modification data; and
   a processor coupled to the memory and the peripheral, the processor being configured to store the modification data in the alternate storage of the peripheral.

32. A system as defined by claim 31, wherein the alternate storage comprises a memory location on the peripheral.

33. A system as defined by claim 31, wherein the alternate storage comprises a non-volatile random access memory location.

34. A system as defined by claim 31, wherein the processor writes the modification data to the alternate storage when the processor receives a reset signal.

* * * * *